United States Patent
Zhang et al.

(10) Patent No.: US 11,548,971 B2
(45) Date of Patent: Jan. 10, 2023

(54) METHOD FOR PRODUCING A RESIN LENS FROM A POLYISOCYANATE AND RELEASE AGENT AT REDUCED PRESSURE

(71) Applicant: YIFENG NEW MATERIALS CO., LTD., Shandong (CN)

(72) Inventors: Chao Zhang, Shandong (CN); Wangen Liang, Shandong (CN)

(73) Assignee: YIFENG NEW MATERIALS CO., LTD., Shandong (CN)

( * ) Notice: Subject to any disclaimer, the term of this patent is extended or adjusted under 35 U.S.C. 154(b) by 987 days.

(21) Appl. No.: 16/305,392

(22) PCT Filed: Jul. 4, 2018

(86) PCT No.: PCT/CN2018/094453
§ 371 (c)(1),
(2) Date: Nov. 29, 2018

(87) PCT Pub. No.: WO2019/205294
PCT Pub. Date: Oct. 31, 2019

(65) Prior Publication Data
US 2021/0221940 A1 Jul. 22, 2021

(30) Foreign Application Priority Data
Apr. 26, 2018 (CN) .......................... 201810384813.3

(51) Int. Cl.
| | | |
|---|---|---|
| *C08G 18/32* | (2006.01) | |
| *C08G 18/38* | (2006.01) | |
| *C08G 18/72* | (2006.01) | |
| *C08G 18/73* | (2006.01) | |
| *C08G 18/75* | (2006.01) | |
| *C08G 18/76* | (2006.01) | |
| *C08G 18/80* | (2006.01) | |
| *G02B 1/04* | (2006.01) | |
| *B29D 11/00* | (2006.01) | |
| *B29K 75/00* | (2006.01) | |

(52) U.S. Cl.
CPC ..... *C08G 18/3215* (2013.01); *C08G 18/3206* (2013.01); *C08G 18/3868* (2013.01); *C08G 18/3874* (2013.01); *C08G 18/3876* (2013.01); *C08G 18/722* (2013.01); *C08G 18/73* (2013.01); *C08G 18/755* (2013.01); *C08G 18/758* (2013.01); *C08G 18/7642* (2013.01); *C08G 18/8016* (2013.01); *C08G 18/8025* (2013.01); *C08G 18/8054* (2013.01); *G02B 1/041* (2013.01); *B29D 11/00432* (2013.01); *B29K 2075/00* (2013.01)

(58) Field of Classification Search
None
See application file for complete search history.

(56) References Cited

U.S. PATENT DOCUMENTS

| | | |
|---|---|---|
| 5,744,568 A | 4/1998 | Kosaka |
| 10,081,703 B2 | 9/2018 | Tsukada |
| 2007/0149656 A1* | 6/2007 | Rayner ................ C09D 175/04 524/27 |
| 2008/0097045 A1 | 4/2008 | Isahaya |
| 2011/0300298 A1* | 12/2011 | Kamibayashi ......... C09D 11/54 427/256 |
| 2012/0127248 A1* | 5/2012 | Koganehira ........... C09D 11/54 347/102 |
| 2012/0196977 A1 | 8/2012 | Tomiyama |
| 2015/0119546 A1 | 4/2015 | Greszta-Franz et al. |
| 2015/0346387 A1* | 12/2015 | Yamasaki .............. G02C 5/008 528/85 |
| 2017/0002176 A1* | 1/2017 | Kadowaki .......... C08G 18/6633 |

(Continued)

FOREIGN PATENT DOCUMENTS

| | | | |
|---|---|---|---|
| CN | 101702038 A | | 5/2010 |
| CN | 101702039 A | | 5/2010 |
| CN | 104379623 A | | 2/2015 |
| CN | 105294974 | * | 2/2016 |
| CN | 105294974 A | | 2/2016 |
| CN | 105960425 A | | 9/2016 |
| CN | 106232658 A | | 12/2016 |

(Continued)

OTHER PUBLICATIONS

STN Next Molecular Structure Searching Hit Results NPL (Year: 2022).*
International Search Report for PCT/CN2018/094453 dated Sep. 18, 2018, ISA/CN.
The 1st Office Action regarding Chinese Patent Application No. CN201810384813.3, dated Jan. 9, 2019. English Translation Provided by http://globaldossier.uspto.gov.

(Continued)

*Primary Examiner* — Joseph S Del Sole
*Assistant Examiner* — Guy F Mongelli
(74) *Attorney, Agent, or Firm* — Yue (Robert) Xu; Apex Attorneys at Law, LLP

(57) ABSTRACT

Provided is a method for producing a resin lens, comprising: A) mixing a polyisocyanate, a modified isocyanate, a catalyst and a release agent, and performing vacuum defoaming at 0~30° C. for 10~90 min to obtain a material a; B) mixing the material a with a sulfur-containing compound, and performing vacuum defoaming at 15~20° C. for 20~120 min to obtain mixed monomers; and C) completing casting of the mixed monomers, and curing to obtain a resin lens. The present disclosure uses polyisocyanate and a modified isocyanate at the same time to prepare a resin lens with higher glass transition temperature and higher surface hardness without producing bank mark and edge fogging. The present disclosure further provides a method for producing modified isocyanate. The obtained modified isocyanate used with polyisocyanate further improves the glass transition temperature and surface hardness of the resin lens without producing bank mark and edge fogging.

7 Claims, No Drawings

(56) References Cited

U.S. PATENT DOCUMENTS

2017/0015776 A1   1/2017   Tsukada
2017/0198083 A1   7/2017   Kim

FOREIGN PATENT DOCUMENTS

| CN | 106832373 | * | 6/2017 | ............... C08K 3/26 |
| CN | 107176931 A | | 9/2017 | |
| CN | 107189034 A | | 9/2017 | |
| WO | WO-2017073684 A1 | * | 5/2017 | ............... C08K 3/26 |

OTHER PUBLICATIONS

The European search report for Application No. EP18782633.4, dated Mar. 13, 2020.
The Australian 1st Office Action for Application No. AU2018250414, dated Oct. 30, 2019.

* cited by examiner

METHOD FOR PRODUCING A RESIN LENS FROM A POLYISOCYANATE AND RELEASE AGENT AT REDUCED PRESSURE

CROSS REFERENCE TO RELATED APPLICATIONS

This application is a US National Phase application based upon PCT Application No. PCT/CN2018/094453, filed Jul. 4, 2018, which claims the priority of Chinese Patent Application No. 201810384813.3, filed on Apr. 26, 2018, and titled with "RESIN LENS AND METHOD FOR PRODUCING THE SAME", and the entire disclosures of which are hereby incorporated by reference.

FIELD

The present disclosure relates to the technical field of resin lenses, specifically to a resin lens and method for producing the same.

BACKGROUND

High refractive index polyurethane resin is formed by the polymerization of isocyanate and polythiol. Currently, the resin lenses sold on the market mainly have four types of MR-7, MR-8, MR-10, and MR-174, and the refractive index is ranged from 1.60 to 1.74. The resins with high transmittance and high refractive index make lenses thinner and lighter, and break the convention of a higher refractive index with a lower Abbe number, which forms clearer images. Furthermore, the material obtained from the perfect combination of isocyanates and polythiols, in terms of mechanical properties, has a higher impact resistance without losing the toughness and abrasion resistance. These characteristics give the resin excellent processability, which is especially appropriate for the production of the most popular diamond-cut glasses, and its superior performance has been globally recognized.

First, the thermosetting resin lens with absolute advantages of good thermal stability, high refractive index, high hardness, good impact resistance, etc., has almost dominated the whole markets. The major domestic and foreign lens manufacturers take the thermosetting polyester lens as an economic backbone. However, for the limit of production technology, the domestic production technology still uses imitation and empirical production method. In terms of product quality, the domestic products are far below that of the foreign products. The main reasons are: the development of domestic thermosetting resins, especially the polyurethane resin lens, starts too late; the investment of domestic research and development is little, of which mainly are carried out by small manufacturing enterprises. Taking polyurethane resin lenses as examples, due to the monopolization of raw materials by foreign enterprises, domestic enterprises cannot obtain high-performance raw materials of components A and B, so that they can only manufacture the resin lens with relatively low quality by using general raw materials from the current market. Taking the production technology of resin lens as an example, the level of domestic production technology is far below the level of foreign production technology.

Then, the refractive index of mainstream glasses lenses in the current market is about 1.5. Thus, it is necessary to increase the thickness of glasses lenses to achieve manufacturing high diopters of lenses, which increases the weight of glasses at the same time. With the comparison of optical glasses, polyurethane optical materials possess advantages of high refractive index, lightweight, excellent impact resistance, and heat resistance, etc., which could be better applied for glasses lenses and other products. However, in the practical application process of resin lens, heat resistance and impact toughness thereof are two contradictory variables. Because the softening temperature increases with a decrease of its impact toughness simultaneously. From the perspective of customer usage, customers prefer to choose high impact toughness lenses for safety consideration, which causes manufacturers to have to face the difficulties of processing at low softening temperature.

The main categories of refractive index are 1.56, 1.60, 1.67, and 1.74 for the mainstream polyurethane lenses in the current market. As the refractive index increases, the cost of required raw materials increases simultaneously. Therefore, the cost can be reduced by introducing a small number of inexpensive components with high refractive index. Moreover, increasing the refractive index can be achieved at the same time. In addition, it can achieve the diversification of refractive index, and it is not limited to a few mainstream refractive index series, which satisfies both the manufacture requirements of manufacturers and the application demands of customers at the same time.

In the production process of current high refractive index two-component (isocyanate and polythiol) polyurethane resin lenses, manufacturers frequently encounter large deviations of prism degree. It is due to the incompatibility of resin refractive index and mold, in which the polyurethane prepolymer is poured into with a fixed degree for curing. To deal with this kind of problem, manufacturers often choose to adjust the refractive index of resin rather than changing molds. Generally, manufacturers often adjust the refractive index of resin by changing a monomer ratio. The plan of directly adjusting the monomer ratio often causes the differences of various properties of resin lens, which leads to more problems, particularly the reduction of impact toughness, glass transition temperature, and anti-yellowing property. However, the manufacturers specialized in the production of polyurethane resin prepolymer will be faced with the problems of downstream lens manufacturer using various molds, and the work of prepolymer manufacturers adjusting the refractive index of resin to match the lens manufacturers' mold is enormous. While the refractive index of resin prepolymer has a huge difference from the fixed refractive index of molds, the adjustment of monomer ratio is invalid. Because the refractive index range adjusted by monomer ratio is limited, and the replacement of monomer also requires the following properties: good anti-yellowing property, higher refractive index, no increased cost, and molecules with certain rigid groups, etc. Simultaneously, the replacement of monomer is a long process, which requires a large amount of research of fundamental properties to ensure various properties qualified. The huge work of the method causes that it is difficult to implement in the factory.

In the actual production of polyurethane lenses, utilizing different isocyanates as raw materials easily produces the phenomenon of bank mark and edge fogging. If only utilizing one kind of highly active isocyanate, the glass transition temperature and the surface hardness of the lenses will be relatively low. Yet, it is difficult to solve the above problems at the same time for polyurethane resin lens.

SUMMARY

In order to solve the above technical problems, the present disclosure aims to provide a method for producing a resin lens with a higher glass transition temperature, higher surface hardness, and simultaneously without the phenomenon of bank mark and edge fogging.

The present disclosure provides a method for producing a resin lens, comprising the steps of:

A) mixing a polyisocyanate, a modified isocyanate, a catalyst and a release agent, and performing vacuum defoaming at 0~30° C. for 10~90 min to obtain a material a;

B) mixing the material a with a sulfur-containing compound, and performing vacuum defoaming at 15~20° C. for 20~120 min to obtain mixed monomers; and C) completing casting of the mixed monomers, and then curing to obtain the resin lens.

Preferably, the polyisocyanate is one or two selected from of the group consisting of xylylene diisocyanate, hexamethylene diisocyanate, 4,4'-dicyclohexylmethane diisocyanate, toluene diisocyanate, 4,4'-methylene bis (phenyl isocyanate), 1,4-diisocyanatobenzene, bis(4-isocyanato)-methadone, phosphorus triisocyanate, 2-biphenylyl isocyanate, 1-naphthyl isocyanate, 2-naphthyl isocyanate, 4-bromophenyl isocyanate, 2,6-diisocyanate naphthalene, 2,7-diisocyanate naphthalene, 1,2-bis(4-isocyanatophenyl)ethane, 1,3,5-triisothiocyanate benzene, 6-isocyanatoisoquinoline, 4-isocyanate iodobenzene, 1,1-dimethyltris(4-isocyanate) benzene, hexamethylene diisocyanate, TDI tripolymer, xylenediisocyanate, 1,4-cyclohexane diisocyanate, 1,5-naphthalene diisocyanate, toluene diisocyanate, diphenylmethane-diisocyanate, m-xyleyne diisocyanate, isophorone diisocyanate, 1,6-diisocyanatohexane, diisocyanate-based polyethylene glycol, 3,3-dimethyl-4,4'-diphenyldiisocyanate, dicyclohexylmethane-4,4-diisocyanate, ethyl phenyl diisocyanate, lysine diisocyanate, o-xylylene diisocyanate, trimethylhexamethylene diisocyanate, 4-chloro-6-methyl-m-phenylene diisocyanate, 3,3 dichlorodiphenyl-4,4'-diisocyanate, 1-chloromethyl-2,4-diisocyanatobenzene, dimethylbiphenyl diisocyanate, 3,3'-dimethoxy-4,4'-biphenylene diisocyanate, 1,4-bis(isocyanatomethyl)cyclohexane, and 1,3-bis(1-isocyanato-1-methylethyl)benzene.

Preferably, the modified isocyanate is selected from a modified isocyanate $b_1$ and/or a modified isocyanate $b_2$.

The modified isocyanate $b_1$ is prepared by the following method:

A1) vacuumizing a compound having a structure represented by formula (I) at 70~90° C. and 0.1~0.3 MPa for 0.5~1 h to obtain a material $c_1$,

HO—X—OH (I);

in formula (I), X is one selected from a group with a structure represented by formula (III) and —(CH2)$_n^-$,

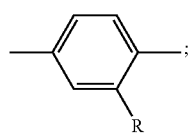
(III)

in formula (III), R is one selected from an alkyl group with 1-3 carbon atoms;

n≤6;

B1) mixing hexamethylene diisocyanate with N,N-diethylethanamine to obtain a mixed solution $c_2$;

C1) adding the material $c_1$ to the mixed solution $c_2$ to react at −10~10° C. for 2~4 h, and then heating the resultant to 70~90° C. to obtain a modified isocyanate $b_1$;

there is no order restriction for step A1) and B1) in the present application.

The modified isocyanate $b_2$ is prepared by the following method:

A2) vacuumizing a compound having a structure represented by formula (II) at 70~90° C. and 0.1~0.31 MPa for 0.5~1 h to obtain a material $d_1$,

HO—Y—OH (II);

in formula (II), Y is one selected from a group with a structure represented by formula (IV),

(IV)

in formula (IV), $R_1$ is one selected from an alkyl group with 2~4 carbon atoms, $R_2$ is selected from, —OH or —SH;

B2) mixing isophorone diisocyanate with N,N-diethylethanamine to obtain a mixed solution $d_2$;

C2) adding the material $d_1$ to the mixed solution $d_2$ to react at 0~20° C. for 3~6 h, and then heating the resultant to 80~100° C. to obtain the modified isocyanate $b_2$;

there is no order restriction for step A2) and B2) in the present application.

Preferably, the compound with a structure represented by formula (I) is one selected from formulas (1)~(9):

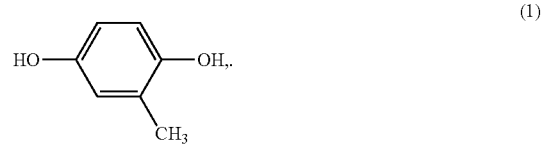
(1)

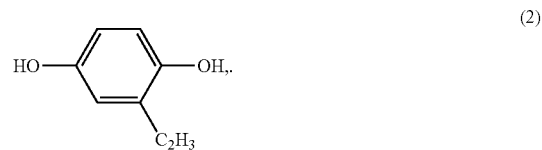
(2)

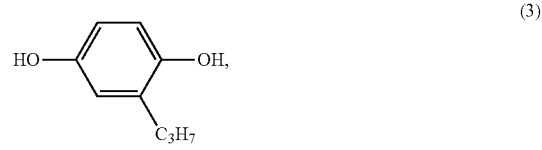
(3)

HO—CH$_2$—OH (4),

HO—CH$_2$—CH$_2$—OH (5),

HO—CH$_2$—CH$_2$—CH$_2$—OH (6),

HO—CH$_2$—CH$_2$—CH$_2$—CH$_2$—OH (7),

HO—CH$_2$—CH$_2$—CH$_2$—CH$_2$—CH$_2$—OH (8),

HO—CH$_2$—CH$_2$—CH$_2$—CH$_2$—CH$_2$—CH$_2$—OH (9);

the compound with a structure represented by formula (II) is one selected from formulas (10)~(15):

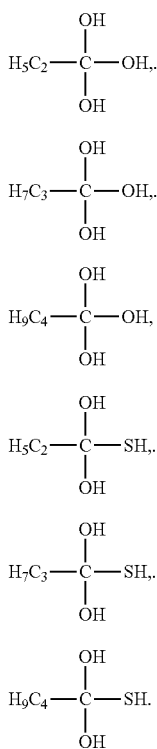

Preferably, the catalyst is one selected from dibutyltin dichloride, stannous octoate, methyltin trichloride, trimethyltin chloride, and dibutyltin dilaurate.

The release agent is one selected from polyoxyethylene ether phosphate and polyoxyethylene nonyl phenyl ether phosphate.

Preferably, the mass ratio of polyisocyanate to modified isocyanate is 1025:5;

The mass ratio of total polyisocyanate and modified isocyanate to the catalyst is 100~1000:1.

The mass ratio of total polyisocyanate and modified isocyanate to the release agent is 480~10000:1.

Preferably, the sulfur-containing compound is one or more selected from aliphatic polythiol, aromatic polythiol, cyclic monothioether and cyclic dithioether, and sulfide.

Preferably, the aliphatic polythiol is one or more selected from: 2,2'-thiodiethanethiol, methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-dimethylcyclohexane-2,3-dithiol, 1,1-bis(mercapto methyl)cyclohexane, bis(2-mercaptoethyl)thiomalate, 2,3-dimercapto-1-propanol(2-mercaptoacetate), 2,3-dimercapto-1-propanol(3-mercaptopropionate), diethylene glycol bis(2-mercaptoacetate), diethylene glycol bis(3-mercaptopropionate), 1,2-dimercaptopropyl methyl ether, 2,3-dimercaptopropyl methyl ether, bis(2-mercaptoethyl)ether, ethylene glycol bis(2-mercaptoacetate), ethylene glycol bis (3-mercaptopropionate), trimethylolpropane bis(2-mercaptoacetate), trimethylolpropane bis(3-mercaptopropionate), pentaerythritol tetrakis(2-mercaptoacetate), pentaerythritol tetrakis(3-mercaptopropionate), tetrakis(mercaptomethyl) methane, 2,3-dithio(2-mecarpto)-1-propanethiol, 2,3-bis(2-mercaptoethylthio)-3-propane-1-thiol, norbornane diisocyanate, 4,4'-dicyclohexylmethane diisocyanate, and the polythiol with a structure represented by formula (16),

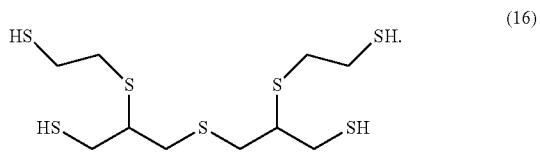 [SMILES: SCCSC(CS)CSCC(CS)SCCS]

The aromatic polythiol is one or more selected from 1,2-benzenedithiol, 1,3-benzenedithiol, 1,4-benzenedithiol, 1,2-bis(mercarptomethyl)benzene, 1,3-bis(mercarptomethyl)benzene, 1,4-bis(mercarptomethyl)benzene, 1,2-bis(mercarptoethyl)benzene, 1,3-bis(mercarptoethyl)benzene, 1,4-bis(mercarptoethyl)benzene, 1,2,3-trimercarpto benzene, 1,2,4-trimercarpto benzene, 1,3,5-trimercarpto benzene, 1,2,3-tris(mercarptomethyl)benzene, 1,2,4-tris(mercarptomethyl)benzene, 1,3,5-tris(mercarptomethyl)benzene, 1,2,3-tris(mercarptoethyl)benzene, 1,2,4-tris(mercarptoethyl)benzene, 1,3,5-tris(mercarptoethyl)benzene, 2,5-toulene dithiol, 3,4-toulene dithiol, 1,3-diphenylpropane 2,2-dithiol, phenylmethane-1,1-dithiol, 2,4-bis(p-mercarptophenyl)pentane, 1,2-bis(mercarptoethylthio) benzene, 1,3-bis(mercarptoethylthio)benzene, 1,4-bis (mecarptoethylthio)benzene, 1,2,3-tris (mercarptomethylthio)benzene, 1,2,4-tris (mercarptomethylthio)benzene, 1,3,5-tris (mercarptoethylthio)benzene, 1,2,3-tris(mercarptoethylthio) benzene, 1,2,4-tris(mercarptoethylthio)benzene, and 1,3,5-tris(mercarptoethylthio)benzene.

The cyclic monothioether and cyclic dithioether preferably can be selected from cyclic monothioether and/or cyclic dithioether.

The sulfide is one or more selected from bis(mercaptomethyl)sulfide, bis(mercaptoethyl)sulfide, bis(mercaptopropyl)sulfide, bis(2-mercaptoethylthio)methane, bis(3-mercaptopropylthio)methane, 1,2-bis(2-mercaptoethylthio)ethane, 1,2-bis(3-mercaptopropylthio)ethane, 1,3-bis(3-mercaptopropylthio)propane, 1,2,3-tris(2-mercaptoethylthio)propane, 1,2,3-bis(3-mercaptopropylthio)propane, 1,2-bis[(2-mercaptoethyl)thiol]-3-mercaptopropane, 4,8-dimercaptomethyl-1,1,1-dimercapto-3,6,9-trithioundecyl, 4,7-dimercaptomethyl-1,11-dimercapto-3,6,9-trithiaundecyl, 5,7-dimercaptomethyl-1,1,1-dimercapto-3,6,9-trithiaundecyl, tetrakis(2-mercaptoethylthiomethyl)methane, tetrakis(3-mercaptopropylthiomethyl)methane, bis(2,3-dimercaptopropyl)sulfide, bis(1,3-dimercaptopropyl) sulfide, 2,5-dimercapto-1,4-dithiane, 2,5-dimercaptomethyl-1,4-dithiane, 2,5-dimercaptomethyl-2,5-dimethyl-1,4-dithiane, bis(mercaptoethyl) disulfide, and bis(mercaptopropyl) disulfide, thioglycolate and mercaptopropionate.

Preferably, the mass ratio of total polyisocyanate and modified isocyanate to sulfur-containing compound is 200~240:210~260.

The present disclosure further provides a resin lens produced by the above method.

The present disclosure provides a method for producing resin lens, comprising the steps of:

A) mixing a polyisocyanate, a modified isocyanate, a catalyst and a release agent, and performing vacuum defoaming at 0~30° C. for 10~90 min to obtain a material a;

B) mixing the material a with a sulfur-containing compound, and performing vacuum defoaming at 15~20° C. for 20~120 min to obtain mixed monomers; and C) completing casting of the mixed monomers, and then curing to obtain the resin lens.

The method disclosed in the present disclosure uses polyisocyanate and modified isocyanate at the same time to prepare a resin lens with higher glass transition temperature, higher surface hardness, simultaneously, without the phenomenon of bank mark and edge fogging. The present disclosure further defines the method for producing modified isocyanate. The obtained modified isocyanate used with polyisocyanate can further improve the glass transition temperature and surface hardness of the resin lens, which will not produce the phenomenon of bank mark and edge fogging.

The experiment results show that the resin lens prepared by the present disclosure has a glass transition temperature of at least 95° C., and is not damaged after being impacted by a ball of 110 g. In addition, there is no phenomenon of bank mark and edge fogging.

DETAILED DESCRIPTION

For a further understanding of the present disclosure, the preferred embodiments of the present disclosure are described in combination of examples. However, it should be understood that these descriptions are only for further illustrating the features and the advantages of the present disclosure and it should not be interpreting as limiting the claims of the present disclosure.

The present disclosure provides a method for producing a resin lens, comprising the steps of:

A) mixing a polyisocyanate, a modified isocyanate, a catalyst and a release agent, and performing vacuum defoaming at 0~30° C. for 10~90 min to obtain a material a;

B) mixing the material a with a sulfur-containing compound, and performing vacuum defoaming at 15~20° C. for 20~120 min to obtain mixed monomers; and C) completing casting of the mixed monomers, and then curing to obtain the resin lens.

The polyisocyanate is one or two selected from of the group consisting of xylylene diisocyanate, hexamethylene diisocyanate, 4,4'-dicyclohexylmethane diisocyanate, toluene diisocyanate, 4,4'-methylene bis (phenyl isocyanate), 1,4-diisocyanatobenzene, bis(4-isocyanato)-methadone, phosphorus triisocyanate, 2-biphenylyl isocyanate, 1-naphthyl isocyanate, 2-naphthyl isocyanate, 4-bromophenyl isocyanate, 2,6-diisocyanate naphthalene, 2,7-diisocyanate naphthalene, 1,2-bis(4-isocyanatophenyl)ethane, 1,3,5-triisothiocyanate benzene, 6-isocyanatoisoquinoline, 4-isocyanate iodobenzene, 1,1-dimethyltris(4-isocyanate)benzene, hexamethylene diisocyanate, TDI tripolymer, xylenediisocyanate, 1,4-cyclohexane diisocyanate, 1,5-naphthalene diisocyanate, toluene diisocyanate, diphenyl-methane-diisocyanate, m-xylyene diisocyanate, isophorone diisocyanate, 1,6-diisocyanatohexane, diisocyanate-based polyethylene glycol, 3,3-dimethyl-4,4'-diphenyldiisocyanate, dicyclohexylmethane-4,4'-diisocyanate, ethyl phenyl diisocyanate, lysine diisocyanate, o-xylylene diisocyanate, trimethylhexamethylene diisocyanate, 4-chloro-6-methyl-m-phenylene diisocyanate, 3,3'-dichlorodiphenyl-4,4'-diisocyanate, 1-chloromethyl-2,4-diisocyanatobenzene, dimethylbiphenyl diisocyanate, 3,3'-dimethoxy-4,4'-biphenylene diisocyanate, 1,4-bis(isocyanatomethyl)cyclohexane, and 1,3-bis(1-isocyanato-1-methylethyl)benzene.

The modified isocyanate is preferably selected from modified isocyanate $b_1$ and/or modified isocyanate $b_2$.

The modified isocyanate $b_1$ is prepared according to the following method:

A1) vacuumizing a compound having a structure represented by formula (I) at 70~90° C. and 0.1~0.3 MPa for 0.5~1 h to obtain a material $c_1$,

HO—X—OH                                                  (I);

in formula (I), X is one selected from the group having a structure represented by formula (III) and —(CH$_2$)$_n$—,

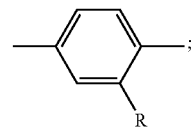
                                                          (III)

in formula (III), R is one selected from an alkyl group with 1~3 carbon atoms;

n≤6;

B1) mixing hexamethylene diisocyanate with N,N-diethylethanamine to obtain a mixed solution $c_2$;

C1) adding the material $c_1$ to the mixed solution $c_2$ to react at −10~10° C. for 2~4 h, and then heating the resultant to 70~90° C. to obtain the modified isocyanate $b_1$;

there is no order restriction for step A1) and B1) in the present application.

In the present disclosure, the compound with a structure represented by formula (I) is one selected from formulas (1)~(9):

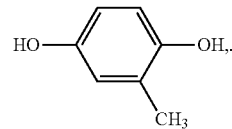
                                                          (1)

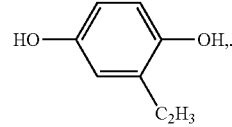
                                                          (2)

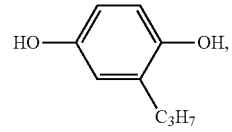
                                                          (3)

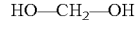
HO—CH$_2$—OH                                              (4),

HO—CH$_2$—CH$_2$—OH                                       (5),

HO—CH$_2$—CH$_2$—CH$_2$—OH                                (6),

HO—CH$_2$—CH$_2$—CH$_2$—CH$_2$—OH                         (7),

HO—CH$_2$—CH$_2$—CH$_2$—CH$_2$—CH$_2$—OH                  (8),

HO—CH$_2$—CH$_2$—CH$_2$—CH$_2$—CH$_2$—CH$_2$—OH           (9).

The compound having a structure represented by formula (I) is evacuated to vacuum at 70~90° C. and 0.1~0.3 MPa for 0.5~1 h to obtain material $c_1$.

Vacuum evacuation is used to dehydrate the compound having a structure represented by formula (I). The vacuum temperature is preferably 70~90° C. In some examples of the present disclosure, the vacuum temperature is 75° C. or 80° C. The vacuum pressure is preferably 0.1~0.3 MPa. In some examples of the present disclosure, the vacuum pressure is 0.1 MPa or 0.3 MPa. The vacuum evacuation time is preferably 0.5~1 h. In some examples of the present disclosure, the vacuum evacuation time is 0.5 h or 1 h.

A mixed solution $c_2$ is obtained by mixing hexamethylene diisocyanate with N,N-diethylethanamine. N,N-diethylethanamine is the catalyst for reaction in step C1). The mass ratio of hexamethylene diisocyanate and N,N-diethylethanamine is preferably 100~500:1. In some examples of the present disclosure, the mass ratio of hexamethylene diisocyanate and N,N-diethylethanamine is 100:1 or 200:1. The mass ratio of the compound with a structure represented by formula (I) and hexamethylene diisocyanate is preferably 50~60:50~60. In some examples of the present disclosure, the mass ratio of the compound with a structure represented by formula (I) and hexamethylene diisocyanate is 50:50 or 60:55.

After obtaining material $c_1$ and the mixed solution $c_2$, $c_1$ is added to the mixed solution $c_2$ to react at −10~10° C. for 2~4 h, and the resultant is heated up to 70~90° C. to obtain modified isocyanate $b_1$.

The adding is preferably a slow adding. The time for adding $c_1$ is preferably 1.5~4 h. In some examples of the present disclosure, the time for adding $c_1$ is 2 h.

The reaction temperature is preferably −10~10° C. In some examples of the present disclosure, the reaction temperature is 0° C. or 5° C. The reaction time is preferably 2~4 h. In some examples of the present disclosure, the reaction time is 2 h or 2.5 h.

The obtained resultant is heated up to 70~90° C. to give modified isocyanate $b_1$. The obtained resultant is heated up to eliminate the reaction residues which are the reactant of hexamethylene diisocyanate and the catalyst of N,N-diethylethanamine. In some examples of the present disclosure, the obtained resultant is heated up to 80° C. or 70° C.

The modified isocyanate $b_2$ is prepared by the following method:

A2) vacuumizing a compound having a structure represented by formula (II) at 70~90° C. and 0.1~0.3 MPa for 0.5~1 h to obtain a material $d_1$,

HO—Y—OH   (II);

in formula (II), the Y is one selected from the group with a structure represented by formula (IV),

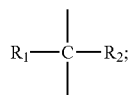   (IV)

in formula (IV), $R_1$ is one selected from an alkyl group with 2~4 carbon atoms, $R_2$ is selected from, —OH or —SH;

B2) mixing isophorone diisocyanate with N,N-diethylethanamine to obtain a mixed solution $d_2$;

C2) adding the material $d_1$ to the mixed solution $d_2$ to react at 0~20° C. for 3~6 h, and then heating the resultant to 80~100° C. to obtain the modified isocyanate $b_2$;

there is no order restriction for step A2) and B2) in the present application.

In the present disclosure, the compound with a structure represented by formula (II) is one selected from formulas (10)~(15):

   (10)

   (11)

   (12)

   (13)

   (14)

   (15)

The compound having a structure represented by formula (II) is evacuated to vacuum at 70~90° C. and 0.1~0.3 MPa for 0.5~1 h to obtain material $d_1$.

Vacuum evacuation is used to dehydrate the compound having a structure represented by formula (II). The vacuum temperature is preferably 70~90° C. In some examples of the present disclosure, the vacuum temperature is 80° C. or 70° C. The vacuum pressure is preferably 0.1~0.3 MPa. In some examples of the present disclosure, the vacuum pressure is 0.1 MPa or 0.3 MPa. The vacuum evacuation time is preferably 0.5~1 h. In some examples of the present disclosure, the vacuum evacuation time is 0.5 h or 1 h.

The mixed solution $d_2$ is obtained by mixing isophorone diisocyanate with N,N-diethylethanamine. N,N-diethylethanamine is the catalyst for reaction in step C2). The mass ratio of isophorone diisocyanate and N,N-diethylethanamine is preferably 800~850:8~10. In some examples of the present disclosure, the mass ratio of isophorone diisocyanate and N,N-diethylethanamine is 850:8 or 800:10. The mass ratio of the compound with a structure represented by formula (II) and isophorone diisocyanate is preferably 80~90:60~80. In some examples of the present disclosure, the mass ratio of the compound with a structure represented by formula (II) and isophorone diisocyanate is 85:60 or 90:80.

After obtaining material $d_1$ and the mixed solution $d_2$, $d_1$ is added to the mixed solution $d_2$ to react at 0~20° C. for 3~6 h, and the resultant is heated up to 80~100° C. to obtain modified isocyanate $b_2$.

The adding is preferably a slow adding. The time for adding $d_1$ is preferably 1~3 h. In some examples of the present disclosure, the time for adding $d_1$ is 2 h.

The reaction temperature is preferably 0~20° C. In some examples of the present disclosure, the reaction temperature is 20° C. or 15° C. The reaction time is preferably 3~6 h. In some examples of the present disclosure, the reaction time is 3 h or 4 h.

The obtained resultant is heated up to 80~100° C. to give modified isocyanate $b_2$. The obtained resultant is heated up to eliminate the reaction residues which are the reactant of isophorone diisocyanate and the catalyst of N,N-diethylethanamine. In some examples of the present disclosure, the obtained resultant is heated up to 100° C. or 80° C.

In the present disclosure, the catalyst is preferably one selected from dibutyltin dichloride, stannous octoate, methyltin trichloride, trimethyltin chloride, and dibutyltin dilaurate.

The release agent is preferably one selected from polyoxyethylene ether phosphate and polyoxyethylene nonyl phenyl ether phosphate, and more preferably polyoxyethylene ether phosphate DDP-3 or polyoxyethylene ether phosphate DDP-5.

The material a is obtained by mixing the above polyisocyanate, a modified isocyanate, a catalyst, and a release agent, and performing vacuum defoaming at 0~30° C. for 10~90 min.

The mass ratio of the polyisocyanate and the modified isocyanate is preferably 10~25:5. In some examples of the present disclosure, the mass ratio of the polyisocyanate and the modified isocyanate is 10:5, 15:5 or 19:5.

The mass ratio of total polyisocyanate and modified isocyanate to the catalyst is preferably 100~1000:1. In some examples of the present disclosure, the mass ratio of total polyisocyanate and modified isocyanate to the catalyst is 250:1 or 240:1.

The mass ratio of total polyisocyanate and the modified isocyanate to the release agent is preferably 480~10000:1. In some examples of the present disclosure, the mass ratio of total polyisocyanate and the modified isocyanate to the catalyst is 1000:1, 480:1 or 750:1.

The mixing is preferably mixing with stirring. The speed of stirring is not specifically limited in the present disclosure, and the stirring speed known to those skilled in the art can be used. The mixing temperature is preferably 15~50° C., more preferably 20~25° C. In some examples of the present disclosure, the mixing temperature is 25° C. or 20° C. The mixing time is preferably 10~70 min, and more preferably 10~15 min. In some examples of the present disclosure, the mixing time is 10 min or 50 min.

After the mixing, the mixture is defoamed in vacuum at 0~30° C. for 10~90 min to give the material a.

The temperature of vacuum defoaming is 0~30° C., preferably 10~15° C. In some examples of the present disclosure, the temperature of vacuum defoaming is 15° C. or 10° C. The time of vacuum defoaming is 10~90 min, preferably 60~90 min. In some examples of the present disclosure, the time of vacuum defoaming is 60 min or 90 min.

After obtaining the material a, mixing the material a with sulfur-containing compound, and performing vacuum defoaming at 15~20° C. for 20~120 min to obtain mixed monomers.

The sulfur-containing compound is preferably one or more selected from aliphatic polythiol, aromatic polythiol, cyclic monothioether and cyclic dithioether, and sulfide.

The aliphatic polythiol is preferably one or more selected from: 2,2'-thiodiethanethiol, methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-dimethylcyclohexane-2,3-dithiol, 1,1-bis(mercaptomethyl)cyclohexane, bis(2-mercaptoethyl)thiomalate, 2,3-dimercapto-1-propanol(2-mercaptoacetate), 2,3-dimercapto-1-propanol(3-mercaptopropionate), diethylene glycol bis(2-mercaptoacetate), diethylene glycol bis(3-mercaptopropionate), 1,2-dimercaptopropyl methyl ether, 2,3-dimercaptopropyl methyl ether, bis(2-mercaptoethyl)ether, ethylene glycol bis(2-mercaptoacetate), ethylene glycol bis(3-mercaptopropionate), trimethylolpropane bis(2-mercaptoacetate), trimethylolpropane bis(3-mercaptopropionate), pentaerythritol tetrakis(2-mercaptoacetate), pentaerythritol tetrakis(3-mercaptopropionate), tetrakis(mercaptomethyl) methane, 2,3-dithio(2-mecarpto)-1-propanethiol, 2,3-bis(2-mercaptoethylthio)-3-propane-1-thiol, norbornane diisocyanate, 4,4'-dicyclohexylmethane diisocyanate, and the polythiol with a structure represented by formula (16),

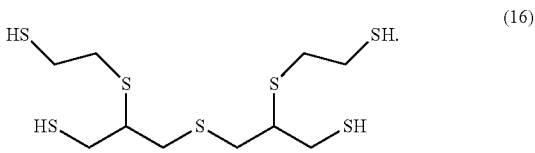

(16)

The aromatic polythiol is preferably one or more selected from 1,2-benzenedithiol, 1,3-benzenedithiol, 1,4-benzenedithiol, 1,2-bis(mercarptomethyl)benzene, 1,3-bis(mercarptomethyl)benzene, 1,4-bis(mercarptomethyl)benzene, 1,2-bis(mercarptoethyl)benzene, 1,3-bis(mercarptoethyl)benzene, 1,4-bis(mercarptoethyl)benzene, 1,2,3-trimercarpto benzene, 1,2,4-trimercarpto benzene, 1,3,5-trimercarpto benzene, 1,2,3-tris(mercarptomethyl)benzene, 1,2,4-tris(mercarptomethyl)benzene, 1,3,5-tris(mercarptomethyl)benzene, 1,2,3-tris(mercarptoethyl)benzene, 1,2,4-tris(mercarptoethyl)benzene, 1,3,5-tris(mercarptoethyl)benzene, 2,5-toulene dithiol, 3,4-toulene dithiol, 1,3-diphenylpropane 2,2-dithiol, phenylmethane-1,1-dithiol, and 2,4-bis(p-mercarptophenyl)pentane, 1,2-bis(mercarptoethylthio)benzene, 1,3-bis(mercarptoethylthio)benzene, 1,4-bis(mecarptoethylthio)benzene, 1,2,3-tris(mercarptomethylthio)benzene, 1,2,4-tris(mercarptomethylthio)benzene, 1,3,5-tris(merrcarptomethylthio)benzene, 1,2,3-tris(mercarptoethylthio)benzene, 1,2,4-tris(mercarptoethylthio)benzene, and 1,3,5-tris(mercarptoethylthio)benzene.

The cyclic monothioether and cyclic dithioether is preferably selected from cyclic monothioether and/or cyclic dithioether, more preferably bis(2,3-epithiopropyl) disulfide and/or bis(2,2-epithiopropyl) sulfide.

The sulfide is preferably one or more selected from bis(mercaptomethyl)sulfide, bis(mercaptoethyl)sulfide, bis(mercaptopropyl)sulfide, bis(2-mercaptoethylthio)methane, bis(3-mercaptopropylthio)methane, 1,2-bis(2-mercaptoethylthio)ethane, 1,2-bis(3-mercaptopropylthio)ethane, 1,3-bis(3-mercaptopropylthio)propane, 1,2,3-tris(2-mercaptoethylthio)propane, 1,2,3-bis(3-mercaptopropylthio)propane, 1,2-bis[(2-mercaptoethyl)thiol]-3-mercaptopropane, 4,8-dimercaptomethyl-1,1,1-dimercapto-3,6,9-trithioundecyl, 4,7-dimercaptomethyl-1,11-dimercapto-3,6,9-trithiaundecyl, 5,7-dimercaptomethyl-1,1,1-dimercapto-3,6,9-trithiaundecyl, tetrakis(2-mercaptoethylthiomethyl)methane, tetrakis(3-mercaptopropylthiomethyl)methane, bis(2,3-dimercaptopropyl)sulfide, bis(1,3-dimercaptopropyl) sulfide, 2,5-dimercapto-1,4-dithiane, 2,5-dimercaptomethyl-1,4-dithiane, 2,5-dimercaptomethyl-2,5-dimethyl-1,4-dithiane, bis(mercaptoethyl) disulfide, and bis(mercaptopropyl) disulfide, thioglycolate and mercaptopropionate.

The present disclosure has no special restriction on the source of the above mentioned sulfur-containing compound, and it may be commercial or self-prepared products. The present disclosure also provides the methods for producing 2,2'-thiodiethanethiol, the polythiol with a structure represented by formula (16), 2,3-dithio(2-mercarpto)-1-propanethiol, and cyclic monothioether and cyclic dithioether.

2,2'-thiodiethanethiol is preferably prepared by the following method:

(1-1) mixing chloroethanol with sodium sulfide nonahydrate at 50~65° C., and then reacting at 50~90° C. for 2~4 h to obtain thiodiglycol;

(1-2) mixing the obtained thiodiglycol with hydrochloric acid solution and N,N-diethylethanamine for reaction to obtain 2,2'-thiodiethanethiol.

In the present disclosure, chloroethanol is first mixed with sodium sulfide nonahydrate at 50~65° C. It is preferred that sodium sulfide nonahydrate is slowly added to chloroethanol with stirring mixing at 50~65° C. The mixing time is preferably 50~80 min.

The mass ratio of chloroethanol and sodium sulfide nonahydrate is preferably 120~160:40~80.

The reaction temperature is 50~90° C. In some examples of the present disclosure, the reaction temperature is 85° C. The reaction time is 2~4 h. In some examples of the present disclosure, the reaction time is 3 h. The reaction is preferably carried out in a three-neck round-bottom flask.

After the reaction, it is preferably further included: performing distillation on the obtained resultant under reduced pressure, adding ethanol with stirring and filtering, and then distilling the obtained filtrate to remove ethanol and to obtain a crude product of thiodiglycol.

In order to obtain the crude product of thiodiglycol, it is preferably further included: dissolving the crude product of thiodiglycol in chloroform, filtering and distilling to remove chloroform to obtain thiodiglycol.

After obtaining thiodiglycol, under hydrogen sulfide atmosphere, thiodiglycol is mixed with hydrochloric acid solution and N,N-diethylethanamine to give 2,2'-tiodiethanethiol after the reaction.

The present disclosure has no special restriction on the concentration of hydrochloric acid solution, and the concentration of the hydrochloric acid solution known to those skilled in the art may be used.

The mass ratio of hydrochloric acid solution, N,N-diethylethanamine, hydrogen sulfide, and chloroethanol is preferably 100~300:1:200~500:100~160.

Under hydrogen sulfide atmosphere, the reaction temperature for thiodiglycol, hydrochloric acid solution and N,N-diethylethanamine is 50~90° C. In some examples of the present disclosure, the reaction temperature is 85° C. The reaction time is 50~80 min. In some examples of the present disclosure, the reaction time is 50 min.

After the reaction, it is preferably also included: extracting the resultant by using dichloromethane, and performing distillation to obtain 2,2'-tiodiethanethiol.

The polythiol with a structure represented by formula (16) is preferably prepared by the following method:

(2-1) mixing epichlorohydrin with ethanol and hydrogen sulfide gas for reacting to produce bis(3-chloro-2-hydroxy-propyl)sulfide;

(2-2) mixing a sodium hydroxide aqueous solution with 2-mercaptoethanol for reacting to produce 2-mercaptoethanolate solution;

(2-3) mixing bis(3-chloro-2-hydroxy-propyl)sulfide with 2-mercaptoethanolate solution for reacting to produce a polyol compound;

(2-4) heating the polyol compound, an aqueous solution of hydrochloric acid and thiourea to react at 109200130° C. for 3~10 h, and then obtaining an organic layer after hydrolysis, which is the polythiol having a structure represented by formula (16).

There is no order restriction for step (2-1) and step (2-2) in the present disclosure.

In the present disclosure, the mass ratio of epichlorohydrin and ethanol is preferably 50~70:100~300; the mass ratio of epichlorohydrin and hydrogen sulfide gas is preferably 50~70:100~200.

The mass ratio of epichlorohydrin, the aqueous solution of sodium hydroxide, and 2-mercaptoethanol is preferably 40~80:100~120:50~70.

The mass ratio of epichlorohydrin, the aqueous solution of hydrochloric acid, and thiourea is preferably 40~80: 100~150:60~80. The concentration of the aqueous solution of hydrochloric acid is preferably 35%.

The reaction temperature in step (2-1) is preferably 70~90° C., and the reaction time is preferably 2~3 h.

The reaction temperature in step (2-2) is preferably 60~120° C., and the reaction time is preferably 3~5 h.

The reaction temperature in step (2-3) is preferably 100~130° C., and the reaction time is preferably 2~3 h.

After obtaining a polyol compound, the present disclosure preferably comprises lowering the temperature of the polyol compound to 70~100° C.

After the reaction of step (2-4), the resultant mixture is preferably cooled to room temperature.

The hydrolysis is preferably: mixing the resultant mixture obtained from the reaction with toluene and an alkaline aqueous solution. The alkaline aqueous solution is preferably ammonia solution or an aqueous solution of sodium hydroxide.

After the hydrolysis, it is preferably included: washing and concentrating under reduced pressure the organic layer after hydrolysis to obtain the polythiol having s structure represented by formula (16).

The 2,3-dithio(2-mercapto)-1-propanethiol is preferably prepared by the following method:

(3-1) under the nitrogen atmosphere, mixing mercaptoethanol with an aqueous solution of sodium hydroxide at 50~80° C. for 20~30 min, and then mixing the resultant mixture with epichlorohydrin and standing at 60~80° C. for 30~50 min;

(3-2) mixing the mixture obtained from step (3-1) with N,N-diethylethanamine, and reacting with hydrogen sulfide at 80~120° C. for 8~12 h with stirring to obtain a supernatant liquid which is 2,3-dithio(2-mercapto)-1-propanethiol.

In the present disclosure, firstly, mercaptoethanol is mixed with an aqueous solution of sodium hydroxide at 50~80° C. for 20~30 min under nitrogen atmosphere, specifically: under nitrogen atmosphere, at 50~80° C., slowly adding the aqueous solution of sodium hydroxide to mercaptoethanol and standing for 20~30 min.

The mass ratio of mercaptoethanol and the aqueous solution of sodium hydroxide is preferably 30~40:60~70.

The mixing temperature is 50~80° C. In some examples of the present disclosure, the mixing temperature is 55° C. The mixing time is 20~30 min. In some examples of the present disclosure, the mixing time is 25 min.

The mixture of mercaptoethanol and the aqueous solution of sodium hydroxide is mixed with epichlorohydrin at 60~80° C. and stand for 30~50 min.

The standing temperature is 60~80° C. In some examples of the present disclosure, the standing temperature is 75° C. The standing time is 30~50 min. In some examples of the present disclosure, the standing time is 40 min.

The mass ratio of epichlorohydrin and mercaptoethanol is preferably 30~55:30~55.

The stabilized mixture after standing is mixed with N,N-diethylethanamine under hydrogen sulfide atmosphere, and reacted under stirring at 80~120° C. for 8~12 h. The obtained supernatant liquid is 2,3-dithio(2-mercapto)-1-propanethiol.

The mass ratio of N,N-diethylethanamine, hydrogen sulfide, and mercaptoethanol is preferably 1~2:200~400:100~200.

The temperature for the reaction under stirring is 80~120° C. In some examples of the present disclosure, the temperature for the reaction under stirring is 100° C. The time for the reaction under stirring is 8~12 h. In some examples of the present disclosure, the time for the reaction under stirring is 10 h.

After the reaction under stirring, it is preferably further included: removing the bottom oil phase of the resultant after the reaction under stirring, washing the obtained supernatant liquid with water of 80° C. until neutral, filtering and drying to obtain 2,3-dithio(2-mercapto)-1-propanethiol.

The cyclic dithioether is preferably prepared by the following method:

mixing a halohydrin, a solvent, a basic catalyst and a metal hydrosulfide solution at 80~100° C. to react for 4~6 h to obtain cyclic dithioether.

The halohydrin is preferably the halohydrin with 3~10 carbon atoms, more preferably chloropropanol or 1-bromo-2-propanol.

The solvent is preferably ethanol or 2-propanol.

The basic catalyst is preferably ammonium carbonate.

The metal hydrosulfide solution is preferably an aqueous solution of sodium hydrosulfide. The concentration of the aqueous solution of sodium hydrosulfide is preferably 30~40 g/mL.

In the present disclosure, the mass ratio of the halohydrin, solvent, basic catalyst, and metallic hydrosulfide is preferably 100~200:200~400:1~2:100~600.

The mixing is preferably: mixing halohydrin, solvent and basic catalyst until homogeneous, and then adding metal hydrosulfide solution.

After the reaction, it is preferably included: separating by extraction to obtain the bottom layer liquid which is a crude product of cyclic dithioether, drying the crude product with anhydrous magnesium sulfate, filtrating, and then distilling to obtain a cyclic dithioether.

The cyclic monothioether is preferably prepared by the following method:

mixing a halohydrin, a solvent, a basic catalyst and a metal hydrosulfide solution at 50~65° C. to react for 4~6 h to obtain a cyclic monothioether.

The solvent is preferably ethanol or 2-propanol.

The basic catalyst is preferably ammonium carbonate.

The metal hydrosulfide solution is preferably an aqueous solution of sodium hydrosulfide. The concentration of the aqueous solution of sodium hydrosulfide is preferably 30~40 g/mL.

In the present disclosure, the mass ratio of the halohydrin, solvent, basic catalyst, and metallic hydrosulfide is preferably 100~200:200~400:1~2:100~600.

The mixing is preferably: mixing halohydrin, solvent and basic catalyst until homogeneous, and then adding metal hydrosulfide solution.

After the reaction, it is preferably included: separating by extraction to obtain the bottom layer liquid which is a crude product of cyclic monothioether, drying the crude product with anhydrous magnesium sulfate, filtrating, and then distilling to obtain a cyclic monothioether.

The mixed monomers are obtained by mixing material a with sulfur-containing compound and subjecting to vacuum defoaming at 15~20° C. for 20~120 min.

The mass ratio of total polyisocyanate and modified isocyanate to the sulfur-containing compound is preferably 200~240:210~260. In some examples of the present disclosure, the mass ratio of total polyisocyanate and modified isocyanate to the sulfur-containing compound is 200:210 or 240:260.

The temperature of vacuum defoaming is 15~20° C. In some examples of the present disclosure, the temperature of vacuum defoaming is 17° C. or 15° C. The time of vacuum defoaming is 20~120 min, preferably 60~80 min. In some examples of the present disclosure, the time of vacuum defoaming is 60 min or 80 min.

In the present disclosure, the vacuum defoaming is preferably: vacuum defoaming under stirring and then static vacuum defoaming. The temperatures of vacuum defoaming under stirring and static are the same, both preferably 15~20° C. The time of vacuum defoaming under stirring is preferably 10~60 min. The time of static vacuum defoaming is preferably 10~60 min.

After obtaining the mixed monomers, the mixed monomers are casted and then cured to obtain a resin lens.

The casting is preferably: injecting the mixed monomers into a mold through a filter membrane under pressurization of dry nitrogen to complete casting.

The pressure for pressurization is preferably 0.1~0.3 MPa. The pore diameter of the filter membrane is preferably 0.1~1 μm.

The curing is preferably: performing a first curing at 30~120° C. after the completion of casting, and the time of the first curing is 18~22 h; after opening mold, cutting edge, and washing, performing a second curing; and then hardening and coating to obtain a resin lens.

The temperature of the first curing is preferably 30~120° C. The time of the first curing is preferably 18~22 h. In some examples of the present disclosure, the time of the first curing is 20 h.

The temperature of the second curing is preferably 30~130° C. In some examples of the present disclosure, the temperature of the second curing is 70~120° C. The time of the second curing is preferably 7~12 h. In some examples of the present disclosure, the time of the second curing is 7 h.

The present disclosure has no special restriction on the source of raw material components, and it may be commercial products.

The present disclosure further provides a resin lens produced by the above method. The resin lens has a higher glass transition temperature, higher surface hardness, simultaneously, without the phenomenon of bank mark and edge fogging. The experiment results show that the resin lens produced by the present disclosure has a glass transition temperature of at least 95° C., and is not damaged after being impacted by a ball of 110 g. At the same time, there is no phenomenon of bank mark and edge fogging.

The present disclosure provides a method for producing a resin lens, comprising the steps of:

A) mixing a polyisocyanate, a modified isocyanate, a catalyst and a release agent, and performing vacuum defoaming at 0~30° C. for 10~90 min to obtain a material a;

B) mixing the material a with a sulfur-containing compound, and performing vacuum defoaming at 15~20° C. for 20~120 min to obtain mixed monomers; and C) completing casting of the mixed monomers, and then curing to obtain the resin lens.

The method disclosed in the present disclosure simultaneously utilizes the polyisocyanate and modified isocyanate. The produced resin lens has a higher glass transition temperature, higher surface hardness, and simultaneously would not produce the phenomenon of bank mark and edge fogging. The present disclosure further defines the method for producing modified isocyanate. Cooperatively use of the obtained modified isocyanate with the polyisocyanate can further improve the glass transition temperature and surface hardness of resin lens without generating the phenomenon of bank mark and edge fogging.

The experiment results show that the resin lens prepared by the present disclosure has a glass transition temperature of at least 95° C., and is not damaged after being impacted by a ball of 110 g. At the same time, there is no phenomenon of bank mark and edge fogging.

In order to further illustrate the present disclosure, the method for producing resin lens of the present disclosure is described in detail in combination with examples, whereas it cannot be understood as limiting the protection scope of the present disclosure.

All reagents used in the following examples are commercially available.

Example 1

50 g of the compound with a structure represented by formula (I) was added to a conical flask and evacuated under vacuum at 80° C. with 0.1 MPa for 0.5 h to obtain material $c_1$.

50 g of hexamethylene diisocyanate was mixed with 0.5 g of N,N-diethylethanamine in another conical flask to obtain a mixed solution $c_2$.

The material $c_1$ was added to the mixed solution $c_2$, of which the time for adding $c_1$ was 2 h, and the reaction was taken place at 5° C. for 2 h; the resultant was heated up to 80° C. to obtain modified isocyanate $b_1$.

Example 2

60 g of the compound with a structure represented by formula (7) was added to a conical flask and evacuated under vacuum at 75° C. with 0.3 MPa for 1 h to obtain material $c_1$.

60 g of hexamethylene diisocyanate was mixed with 0.3 g of N,N-diethylethanamine in another conical flask to obtain a mixed solution $c_2$.

The material $c_1$ was added to the mixed solution $c_2$, of which the time for adding $c_1$ was 2 h, and the reaction was taken place at 0° C. for 2.5 h; the resultant was heated up to 70° C. to obtain modified isocyanate $b_1$.

Example 3

85 g of the compound with a structure represented by formula (10) was added to a conical flask and evacuated under vacuum at 80° C. with 0.1 MPa for 0.5 h to obtain material $d_1$.

60 g of isophorone diisocyanate was mixed with 0.8 g of N,N-diethylethanamine in another conical flask to obtain a mixed solution $d_2$.

The material $d_1$ was added to the mixed solution $d_2$, of which the time for adding $d_1$ was 2 h, and the reaction was taken place at 20° C. for 3 h the resultant was heated up to 100° C. to obtain modified isocyanate $b_2$.

Example 4

90 g of the compound with a structure represented by formula (14) was added to a conical flask and evacuated under vacuum at 70° C. with 0.3 MPa for 1 h to obtain material $d_1$.

80 g of isophorone diisocyanate was mixed with 1.0 g of N,N-diethylethanamine in another conical flask to obtain a mixed solution $d_2$.

The material $d_1$ was added to the mixed solution $d_2$, of which the time for adding $d_1$ was 2 h, and the reaction was taken place at 10° C. for 4 h; the resultant was heated up to 80° C. to obtain modified isocyanate $b_2$.

Example 5

100 g of hexamethylene diisocyanate, 50 g of 4,4'-dicyclohexylmethane diisocyanate, 50 g of modified isocyanate $b_1$ prepared in Example, 0.8 g of stannous octoate, and 0.2 g of DDP-3 were weighed and mixed under stirring at 25° C. for 10 min, and then the resultant was subjected to vacuum defoaming at 15° C. for 60 min to obtain material a.

The material a was mixed with 180 g of 2,3-bis(2-mercaptoethylthio)-3-propane-1-thiol, 30 g of pentaerythritol tetrakis(3-mercaptopropionate); at 17° C., the mixture was first subjected to vacuum defoaming under stirring for 40 min, and then static vacuum defoaming for 20 min to obtain mixed monomers.

The mixed monomers was pressurized by dry nitrogen and injected into a mold through a filter membrane to complete casting. The pressure for pressurization was 0.1 MPa. The pore diameter of the filter membrane was 0.1 μm. The mold after completing the casting was first cured at 30~120° C., and the time of the first curing was 20 h. After opening mold, cutting edge, and washing, the second curing was carried out at 70~120° C., and the time of second curing was 7 h, then a hardening and film coating were applied to get a resin lens.

Comparative Example 1

100 g of hexamethylene diisocyanate, 50 g of 4,4'-dicyclohexylmethane diisocyanate, 0.6 g of stannous octoate, and 0.15 g of DDP-3 were weighed and mixed under stirring at 25° C. for 10 min, and then the resultant was subjected to vacuum defoaming at 15° C. for 60 min to obtain material a.

The material a was mixed with 210 g of 2,3-bis(2-mercaptoethylthio)-3-propane-1-thiol; at 17° C., the mixture was first subjected to vacuum defoaming under stirring for 40 min, and then static vacuum defoaming for 20 min to obtain mixed monomers.

The mixed monomers was pressurized by dry nitrogen and injected into a mold through a filter membrane to complete casting. The pressure for pressurization was 0.1 MPa. The pore diameter of the filter membrane was 0.1 μm. The mold after completing the casting was first cured at 30~120° C., and the time of the first curing was 20 h. After opening mold, cutting edge, and washing, the second curing was carried out at 70~120° C., and the time of second curing was 7 h, then a hardening and film coating were applied to get a resin lens.

Example 6

80 g of hexamethylene diisocyanate, 110 g of isophorone diisocyanate, 50 g of the modified isocyanate $b_2$ prepared in Example 3, 1.0 g of methyltin trichloride, and 0.5 g of DDP-5 were weighed and mixed under stirring at 20° C. for 50 min, and then the resultant was subjected to vacuum defoaming at 10° C. for 90 min to obtain material a.

The material a was mixed with 200 g of 2,3-bis(2-mercaptoethylthio)-3-propane-1-thiol, 60 g of bis(2,2-epithiopropyl) sulfide; at 15° C., the mixture was first subjected to vacuum defoaming under stirring for 60 min, and then static vacuum defoaming for 20 min to obtain mixed monomers.

The mixed monomers were pressurized by dry nitrogen and injected into a mold through a filter membrane to complete casting. The pressure for pressurization was 0.3 MPa. The pore diameter of the filter membrane was 0.5 µm. The mold after completing the casting was first cured at 30~120° C., and the time of the first curing was 20 h. After opening mold, cutting edge, and washing, the second curing was carried out at 70~120° C., and the time of second curing was 7 h, then a hardening and film coating were applied to get a resin lens.

Comparative Example 2

120 g of hexamethylene diisocyanate, 110 g of isophorone diisocyanate, 1.0 g of methyltin trichloride, and 0.5 g of DDP-5 were weighed and mixed under stirring at 20° C. for 50 min, and then the resultant was subjected to vacuum defoaming at 10° C. for 90 min to obtain material a.

The material a was mixed with 120 g of 2,3-bis(2-mercaptoethylthio)-3-propane-1-thiol, 110 g of bis(2,2-epithiopropyl) sulfide; at 15° C., the mixture was first subjected to vacuum defoaming under stirring for 60 min, and then static vacuum defoaming for 20 min to obtain mixed monomers.

The mixed monomers were pressurized by dry nitrogen and injected into a mold through a filter membrane to complete casting. The pressure adding was 0.3 MPa. The pore diameter of the filter membrane was 0.5 µm. The mold after completing the casting was first cured at 30~120° C., and the time of the first curing was 20 h. After opening mold, cutting edge, and washing, the second curing was carried out at 70~120° C., and the time of second curing was 7 h, then a hardening and film coating were applied to get a resin lens.

Example 7

100 g of norbornane diisocyanate, 50 g of 4,4'-dicyclohexylmethane diisocyanate, 50 g of the modified isocyanate $b_1$ prepared in Example 2, 0.8 g of dibutyltin dilaurate, and 0.2 g of DDP-3 were weighed and mixed under stirring at 25° C. for 10 min, and then the resultant was subjected to vacuum defoaming at 15° C. for 60 min to obtain material a.

The material a was mixed with 150 g of 2,3-bis(2-mercaptoethylthio)-3-propane-1-thiol, 30 g of bis(2,3-epoxypropyl) disulfide; at 17° C., the mixture was first subjected to vacuum defoaming under stirring for 40 min, and then static vacuum defoaming for 20 min to obtain mixed monomers.

The mixed monomers were pressurized by dry nitrogen and injected into a mold through a filter membrane to complete casting. The pressure for pressurization was 0.1 MPa. The pore diameter of the filter membrane was 0.1 µm. The mold after completing the casting was first cured at 30~120° C., and the time of the first curing was 20 h. After opening mold, cutting edge, and washing, the second curing was carried out at 70~120° C., and the time of second curing was 7 h, then a hardening and film coating were applied to get a resin lens.

Comparative Example 3

200 g of norbornane diisocyanate, 100 g of 4,4'-dicyclohexylmethane diisocyanate, 1.2 g of dibutyltin dilaurate, and 0.6 g of DDP-3 were weighed and mixed under stirring at 25° C. for 10 min, and then the resultant was subjected to vacuum defoaming at 15° C. for 60 min to obtain material a.

The material a was mixed with 220 g of 2,3-bis(2-mercaptoethylthio)-3-propane-1-thiol, 60 g of bis(2,3-epoxypropyl) disulfide; at 17° C., the mixture was first subjected to vacuum defoaming under stirring for 40 min, and then static vacuum defoaming for 20 min to obtain mixed monomers.

The mixed monomers were pressurized by dry nitrogen and injected into a mold through a filter membrane to complete casting. The pressure for pressurization was 0.1 MPa. The pore diameter of the filter membrane was 0.1 µm. The mold after completing the casting was first cured at 30~120° C., and the time of the first curing was 20 h. After opening mold, cutting edge, and washing, the second curing was carried out at 70~120° C., and the time of second curing was 7 h, then a hardening and film coating were applied to get a resin lens.

Example 8

100 g of xylylene diisocyanate, 50 g of the modified isocyanate $b_1$ prepared in Example, 0.6 g of dibutyltin dilaurate, and 0.2 g of DDP-5 were weighed and mixed under stirring at 25° C. for 10 min, and then the resultant was subjected to vacuum defoaming at 15° C. for 60 min to obtain material a.

A cyclic dithioether, which was bis(2,3-epoxypropyl) disulfide, was prepared by the following method:

50 g of chloropropanol, 100 g of ethanol and 1.0 g of ammonium carbonate were mixed homogeneously, 50 g of the aqueous solution of sodium hydrosulfide with a concentration of 30 g/mL was added, and the mixture was reacted at 80° C. for 5 h. Extraction and separation were performed and the obtained bottom layer liquid was a crude product of cyclic dithioether. The cyclic dithioether, which was bis(2,3-epoxypropyl) disulfide, was obtained by drying the crude product with anhydrous magnesium sulfate, filtrating and distilling.

The material a was mixed with 100 g of pentaerythritol tetrakis(3-mercaptopropionate) and 40 g of bis(2,3-epoxypropyl) disulfide; at 17° C., the mixture was first subjected to vacuum defoaming under stirring for 40 min, and then static vacuum defoaming for 20 min to obtain mixed monomers.

The mixed monomers were pressurized by dry nitrogen and injected into a mold through a filter membrane to complete casting. The pressure for pressurization was 0.3 MPa. The pore diameter of the filter membrane was 0.1 µm. The mold after completing the casting was first cured at 30~120° C., and the time of the first curing was 20 h. After opening mold, cutting edge, and washing, the second curing was carried out at 70~120° C., and the time of second curing was 7 h, then a hardening and film coating were applied to get a resin lens.

Comparative Example 4

100 g of xylylene diisocyanate, 0.6 g of dibutyltin dilaurate, and 0.2 g of DDP-5 were weighed and mixed under stirring at 25° C. for 10 min, and then the resultant was subjected to vacuum defoaming at 15° C. for 60 min to obtain material a.

The material a was mixed with 100 g of pentaerythritol tetrakis(3-mercaptopropionate) and 40 g of the cyclic dithioether prepared in Example 8; at 17° C., the mixture was first subjected to vacuum defoaming under stirring for 40 min, and then static vacuum defoaming for 20 min to obtain mixed monomers.

The mixed monomers were pressurized by dry nitrogen and injected into a mold through a filter membrane to complete casting. The pressure adding was 0.3 MPa. The pore diameter of the filter membrane was 0.1 μm. The mold after completing the casting was first cured at 30~120° C., and the time of the first curing was 20 h. After opening mold, cutting edge, and washing, the second curing was carried out at 70~120° C., and the time of second curing was 7 h, then a hardening and film coating were applied to get a resin lens.

Example 9

80 g of hexamethylene diisocyanate, 110 g of isophorone diisocyanate, 50 g of the modified isocyanate $b_2$ prepared in Example 4, 1.0 g of methyltin trichloride, and 0.5 g of DDP-5 were weighed and mixed under stirring at 20° C. for 50 min, and then the resultant was subjected to vacuum defoaming at 10° C. for 90 min to obtain material a.

Thiodiglycol was prepared by the following method:

In a three-neck round-bottom flask, at the temperature of 55° C., 60 g of sodium sulfide nonahydrate was slowly added to 160 g of chloroethanol, mixed under stirring for 70 min, and then reacted for 3 h at the temperature of 85° C. The resultant was distillated under reduced pressure, and ethanol was added and stirred, followed by filtrating. The obtained filtrate was distillated to remove ethanol and a crude product of thiodiglycol was obtained. The crude product of thiodiglycol was dissolved in chloroform, and then the resultant was filtrated, distillated under reduced pressure to remove chloroform to obtain thiodiglycol. In an atmosphere of 200 g of hydrogen sulfide, thiodiglycol was mixed with 100 g of hydrochloric acid solution and 1 g of N,N-diethylethanamine to react at 85° C. for 50 min. The resultant was extracted by dichloromethane and 2,2'-thiodiethanethiol was obtained after distillation.

The material a was mixed with 200 g of 2,2'-thiodiethanethiol and 60 g of 1,2-benzenedithiol; at 15° C., the mixture was first subjected to vacuum defoaming under stirring for 60 min, and then static vacuum defoaming for 20 min to obtain mixed monomers.

The mixed monomers were pressurized by dry nitrogen and injected into a mold through a filter membrane to complete casting. The pressure for pressurization was 0.3 MPa. The pore diameter of the filter membrane was 0.1 μm. The mold after completing the casting was first cured at 30~120° C., and the time of the first curing was 20 h. After opening mold, cutting edge, and washing, the second curing was carried out at 70~120° C., and the time of second curing was 7 h, then a hardening and film coating were applied to get a resin lens.

Example 10

100 g of hexamethylene diisocyanate, 50 g of 4,4'-dicyclohexylmethane diisocyanate, 50 g of the modified isocyanate $b_1$ prepared in Example 1, 0.8 g of stannous octoate, and 0.2 g of DDP-3 were weighed and mixed under stirring at 25° C. for 10 min, and then the resultant was subjected to vacuum defoaming at 15° C. for 60 min to obtain material a.

2,3-dithio(2-mercapto)-1-propanethiol was prepared by the following method:

Under nitrogen atmosphere and the temperature of 55° C., 60 g of an aqueous solution of sodium hydroxide was slowly added to 30 g of mercaptoethanol and the mixture stood for 25 min; the obtained mixture was mixed with 30 g of epichlorohydrin and stood at 75° C. for 40 min; then nitrogen gas was turned off, and the stabilized mixture was mixed with 0.3 g of N,N-diethylethanamine and reacted at 100° C. for 10 h under stirring and with 60 g of hydrogen sulfide. The bottom oil phase of the product from the reaction under stirring was removed, and the obtained supernatant liquid was washed with 80° C. water until neutral. 2,3-dithio(2-mercapto)-1-propanethiol was obtained after filtrating and drying.

The material a was mixed with 180 g of 2,3-dithio(2-mercapto)-1-propanethiol, 30 g of pentaerythritol tetrakis(3-mercaptopropionate); at 17° C., the mixture was first subjected to vacuum defoaming under stirring for 40 min, and then static vacuum defoaming for 20 min to obtain mixed monomers.

The mixed monomers were pressurized by dry nitrogen and injected into a mold through a filter membrane to complete casting. The pressure for pressurization was 0.3 MPa. The pore diameter of the filter membrane was 0.1 μm. The mold after completing the casting was first cured at 30~120° C., and the time of the first curing was 20 h. After opening mold, cutting edge, and washing, the second curing was carried out at 70~120° C., and the time of second curing was 7 h, then a hardening and film coating were applied to get a resin lens.

Example 11

100 g of hexamethylene diisocyanate, 50 g of 4,4'-dicyclohexylmethane diisocyanate, 50 g of the modified isocyanate $b_1$ prepared in Example 1, 0.8 g of stannous octoate, and 0.2 g of DDP-3 were weighed and mixed under stirring at 25° C. for 10 min, and then the resultant was subjected to vacuum defoaming at 15° C. for 60 min to obtain material a.

The polythiol with a structure represented by formula (16) was prepared as following:

70 g of epichlorohydrin, 100 g of ethanol and 120 g of hydrogen sulfide gas were mixed to react at 60° C. for 3 h to produce bis(3-chloro-2-hydroxy-propyl)sulfide. 100 g of an aqueous solution of sodium hydroxide with a concentration of 35% was mixed with 50 g 2-mercaptoethanol to react at 120° C. for 5 h to produce 2-mercaptoethanolate solution. The bis(3-chloro-2-hydroxy-propyl)sulfide was mixed with the 2-mercaptoethanolate solution to react at 120° C. for 2 h to obtain a polyol compound. The polyol compound was cooled to 90° C. and reacted with an aqueous solution of hydrochloric acid and thiourea at 100° C. with heating for 3~10 h. The resultant mixture was cooled to room temperature and mixed with toluene and ammonia water for hydrolysis. The organic layer after hydrolysis was washed and concentrated under reduced pressure to obtain the polythiol having a structure represented by formula (16).

The material a was mixed with 180 g of the polythiol having a structure represented by formula (16), 30 g of pentaerythritol tetrakis(3-mercaptopropionate); at 17° C., the mixture was first subjected to vacuum defoaming under stirring for 40 min, and then static vacuum defoaming for 20 min to obtain mixed monomers.

The mixed monomers were pressurized by dry nitrogen and injected into a mold through a filter membrane to complete casting. The pressure for pressurization was 0.3 MPa. The pore diameter of the filter membrane was 0.1 μm. The mold after completing the casting was first cured at 30~120° C., and the time of the first curing was 20 h. After opening mold, cutting edge, and washing, the second curing was carried out at 70~120° C., and the time of second curing was 7 h, then a hardening and film coating were applied to get a resin lens.

Example 12

The glass transition temperature, impact resistance and generation of bank mark and edge fogging of the resin lenses prepared from the above examples 5~11 and comparative examples 1~4 were characterized, and the results were represented in Table 1.

TABLE 1

Comprehensive performance of the resin lenses prepared from examples 5~11 and comparative examples 1~4

| | Edge fogging | Glass Transition Temperature | Impact Resistance | Bank Mark Test |
|---|---|---|---|---|
| Example 5 | No | 102° C. | unbroken by 110 g ball impacting | No |
| Comparative example 1 | Yes | 85° C. | broken by 110 g ball impacting | Yes |
| Example 6 | No | 98° C. | unbroken by 110 g ball impacting | No |
| Comparative example 2 | Yes | 82° C. | broken by 110 g ball impacting | Yes |
| Example 7 | No | 108° C. | unbroken by 110 g ball impacting | No |
| Comparative example 3 | Yes | 88° C. | broken by 110 g ball impacting | Yes |
| Example 8 | No | 95° C. | unbroken by 110 g ball impacting | No |
| Comparative example 4 | Yes | 75° C. | broken by 110 g ball impacting | Yes |
| Example 9 | No | 100° C. | unbroken by 110 g ball impacting | No |
| Example 10 | No | 105° C. | unbroken by 110 g ball impacting | No |
| Example 11 | No | 98° C. | unbroken by 110 g ball impacting | No |

The experiment results show that the resin lens prepared by the present disclosure has a glass transition temperature of at least 95° C., and is not damaged after being impacted by a ball of 110 g. At the same time, there is no phenomenon of bank mark and edge fogging.

The above illustration of the disclosed examples enables those skilled in the art to make or use the present disclosure. Various modifications of these examples are obvious to those skilled in the art, and the general principles defined in the present disclosure may be implemented in other examples without departing the spirit or scope of the present disclosure. Therefore, the present disclosure is not to be limited to the examples shown herein, whereas it is to be accorded the broadest scope consistent with the principles and novel features disclosed in the present disclosure.

What is claimed is:

1. A method for producing a resin lens, comprising steps of:
A) mixing a polyisocyanate, a modified isocyanate, a catalyst and a release agent, and performing vacuum defoaming at 0-30° C. for 10-90 min to obtain a material a;
wherein the modified isocyanate is selected from a modified isocyanate $b^1$ and/or a modified isocyanate $b_2$;
the modified isocyanate $b^1$ is prepared according to the following method:
A1) maintaining a compound having a structure represented by formula (I) at 70-90° C. and a reduced pressure of 0.1-0.3 MPa for 0.5-1 h to obtain a material $c_1$,

HO—X—OH　　(I);

formula (I) has a structure represented by formula (III) or OH—$(CH_2)_n$—OH,

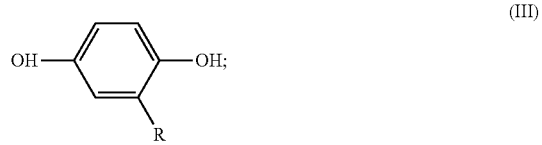

in formula (III), R is one selected from an alkyl group with 1-3 carbon atoms;
$n \leq 6$;
B1) mixing hexamethylene diisocyanate with N,N-diethylethanamine to obtain a mixed solution $c_2$, wherein the mass ratio of the compound having a structure represented by formula (I) to hexamethylene diisocyanate is 50-60:50-60;
C1) adding the material $c_1$ to the mixed solution $c_2$ to react at −10-10° C. for 2-4 h, and then heating the resultant to 70-90° C. to obtain the modified isocyanate $b_1$;
there is no order restriction for step A1) and step B1) in the present application; and
the modified isocyanate $b_2$ is prepared according to the following method:
A2) maintaining a compound having a structure represented by formula (II) at 70-90° C. and a reduced pressure of 0.1-0.3 MPa for 0.5-1 h to obtain a material $d_1$,

HO—Y—OH　　(II);

in formula (II), Y is one selected from a group with a structure represented by formula (IV),

in formula (IV), $R_1$ is one selected from an alkyl group with 2-4 carbon atoms, $R_2$ is selected from —OH or —SH;

B2) mixing isophorone diisocyanate with N,N-diethylethanamine to obtain a mixed solution d₂, wherein the mass ratio of the compound having a structure represented by formula (II) and isophorone diisocyanate is 80-90:60-80;

C2) adding the material d₁ to the mixed solution d₂ to react at 0-20° C. for 3-6 h, and then heating the resultant to 80-100° C. to obtain the modified isocyanate b₂; and there is no order restriction for step A2) and step B2) in the present application;

the mass ratio of the polyisocyanate and the modified isocyanate is 10-25:5;

B) mixing the material a with a sulfur-containing compound, and performing vacuum defoaming at 15-20° C. for 20-120 min to obtain mixed monomers, wherein the mass ratio of total polyisocyanate and modified isocyanate to the sulfur-containing compound is 200-240: 210-260; and C) completing casting of the mixed monomers, and then curing to obtain the resin lens.

2. The method according to claim 1, wherein the polyisocyanate is one or two selected from of the group consisting of xylylene diisocyanate, hexamethylene diisocyanate, 4,4'-dicyclohexylmethane diisocyanate, toluene diisocyanate, 4,4'-methylene bis (phenylisocyanate), 1,4-diisocyanatobenzene, bis(4-isocyanato)-methadone, 2,6-diisocyanate naphthalene, 2,7-diisocyanate naphthalene, 1,2-bis(4-isocyanatophenyl)ethane, 1,3,5-triisothiocyanate benzene, 1,1-dimethyltris(4-isocyanate)benzene, hexamethylene diisocyanate, TDI tripolymer, xylenediisocyanate, 1,4-cyclohexane diisocyanate, 1,5-naphthalene diisocyanate, toluene diisocyanate, diphenyl-methane-diisocyanate, m-xylyene diisocyanate, isophorone diisocyanate, diisocyanate-based polyethylene glycol, 3,3-dimethyl-4,4'-diphenyldiisocyanate, dicyclohexylmethane-4,4-diisocyanate, ethyl phenyl diisocyanate, lysine diisocyanate, o-xylylene diisocyanate, trimethylhexamethylene diisocyanate, 4-chloro-6-methyl-m-phenylene diisocyanate, 3,3'-dichlorodiphenyl-4,4'-diisocyanate, 1-chloromethyl-2,4-diisocyanatobenzene, dimethylbiphenyl diisocyanate, 3,3'-dimethoxy-4,4'-biphenylene diisocyanate, 1,4-bis(isocyanatomethyl)cyclohexane, and 1,3-bis(1-isocyanato-1-methylethyl)benzene.

3. The method according to claim 1, wherein the compound with the structure represented by formula (I) is one selected from formulas (1)-(9):

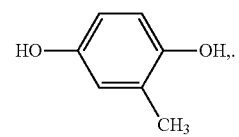

(1)

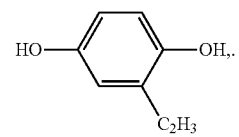

(2)

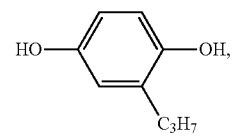

(3)

HO—CH₂—OH (4), HO—CH₂—CH₂—OH (5), HO—CH₂—CH₂—CH₂—OH (6), HO—CH₂—CH₂—CH₂—CH₂—OH (7), HO—CH₂—CH₂—CH₂—CH₂—CH₂—OH (8), HO—CH₂—CH₂—CH₂—CH₂—CH₂—CH₂—OH (9);

the compound with the structure represented by formula (II) is one selected from formulas (10)-(15):

(10)

(11)

(12)

(13)

(14)

(15)

4. The method according to claim 1, wherein the catalyst is one selected from dibutyltin dichloride, stannous octoate, methyltin trichloride, trimethyltin chloride, and dibutyltin dilaurate; and the release agent is one selected from polyoxyethylene ether phosphate and polyoxyethylene nonyl phenyl ether phosphate.

5. The method according to claim 1, wherein P1 the mass ratio of total polyisocyanate and modified isocyanate to the catalyst is 100-1000:1;

the mass ratio of total polyisocyanate and modified isocyanate to the release agent is 480-10000:1.

6. The method according to claim 1, wherein the sulfur-containing compound is one or more selected from aliphatic polythiol, aromatic polythiol, cyclic monothioether and cyclic dithioether, and sulfide.

7. The method according to claim 6, wherein the aliphatic polythiol is one or more selected from:

2,2'-thiodiethanethiol, methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-dimethylcyclohexane-2,3-dithiol, 1,1-bis(mercaptomethyl)cyclohexane, bis(2-mercaptoethyl)thiomalate, 2,3-dimercapto-1-propanol (2-mercaptoacetate), 2,3-dimercapto-1- propanol (3-mercaptopropionate), diethylene glycol bis (2-mercaptoacetate), diethylene glycol bis(3-mercaptopropionate), 1,2-dimercaptopropyl methyl ether, 2,3-dimercaptopropyl methyl ether, bis(2-mercaptoethyl) ether, ethylene glycol bis(2-mercaptoacetate), ethylene glycol bis(3-mercaptopropionate), trimethylolpropane bis(2-mercaptoacetate), trimethylolpropane bis(3-mercaptopropionate), pentaerythritol tetrakis(2-mercaptoacetate), pentaerythritol tetrakis(3-mercaptopropionate), tetrakis(mercaptomethyl)methane, 2,3-dithio(2-mecarpto)-1-propanethiol, 2,3-bis(2-mercaptoethylthio)-3-propane-1-thiol, and polythiol with a structure represented by formula (16),

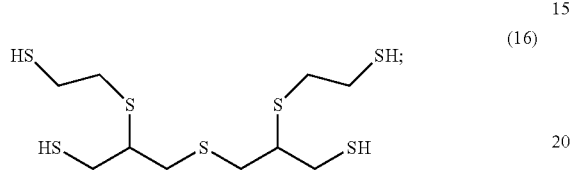

the aromatic polythiol is one or more selected from 1,2-benzenedithiol, 1,3-benzenedithiol, 1,4-benzenedithiol, 1,2-bis(mercarptomethyl)benzene, 1,3-bis(mercarptomethyl)benzene, 1,4-bis(mercarptomethyl)benzene, 1,2-bis(mercaptoethyl)benzene, 1,3-bis (mercaptoethyl)benzene, 1,4-bis(mercaptoethyl) benzene, 1,2,3-trimercarpto benzene, 1,2,4-trimercarpto benzene, 1,3,5-trimercarpto benzene, 1,2,3-tris(mercarptomethyl)benzene, 1,2,4-tris (mercarptomethyl)benzene, 1,3,5-tris (mercarptomethyl)benzene, 1,2,3-tris(mercarptoethyl) benzene, 1,2,4-tris(mercarptoethyl)benzene, 1,3,5-tris (mercarptoethyl)benzene, 2,5-toulene dithiol, 3,4-toulene dithiol, 1,3-diphenylpropane2,2-dithiol, phenylmethane-1,1-dithiol, 2,4-bis(p-mercarptophenyl)pentane, 1,2-bis(mercarptoethylthio)benzene, 1,3-bis(mercarptoethylthio)benzene, 1,4-bis(mecarptoethylthio)benzene, 1,2,3-tris(mercarptomethylthio) benzene, 1,2,4-tris(mercarptomethylthio)benzene, 1,3,5-tris(merrcarptomethylthio)benzene, 1,2,3-tris (mercarptoethylthio)benzene, 1,2,4-tris (mercarptoethylthio)benzene, and 1,3,5-tris (mercarptoethylthio)benzene;

the cyclic monothioether and cyclic dithioether is selected from cyclic monothioether and/or cyclic dithioether;

the sulfide is one or more selected from bis(mercaptomethyl)sulfide, bis(mercaptoethyl)sulfide, bis(mercaptopropyl)sulfide, bis(2-mercaptoethylthio)methane, bis (3-mercaptopropylthio)methane, 1,2-bis(2-mercaptoethylthio)ethane, 1,2-bis(3-mercaptopropylthio)ethane, 1,3-bis(3-mercaptopropylthio)propane, 1,2,3-tris(2-mercaptoethylthio)propane, 1,2,3-bis(3-mercaptopropylthio)propane, 1,2-bis[(2-mercaptoethyl)thiol]-3-mercaptopropane, 4,8-dimercaptomethyl-1, 1,1-dimercapto-3,6,9-trithioundecyl, 4,7-dimercaptomethyl-1,11-dimercapto-3,6,9-trithiaundecyl, 5,7-dimercaptomethyl-1, 1,1-dimercapto-3,6,9-trithiaundecyl, tetrakis(2-mercaptoethylthiomethyl) methane, tetrakis(3-mercaptopropylthiomethyl) methane, bis(2,3-dimercaptopropyl)sulfide, bis(1,3-dimercaptopropyl) sulfide, 2,5-dimercapto-1,4-dithiane, 2,5-dimercaptomethyl-1,4-dithiane, 2,5-dimercaptomethyl-2,5-dimethyl-1,4-dithiane, bis (mercaptoethyl) disulfide, and bis(mercaptopropyl) disulfide, thioglycolate and mercaptopropionate.

* * * * *